May 13, 1941.  W. F. REISCH  2,242,194
OVERSPEED EMERGENCY GOVERNOR
Filed June 12, 1939
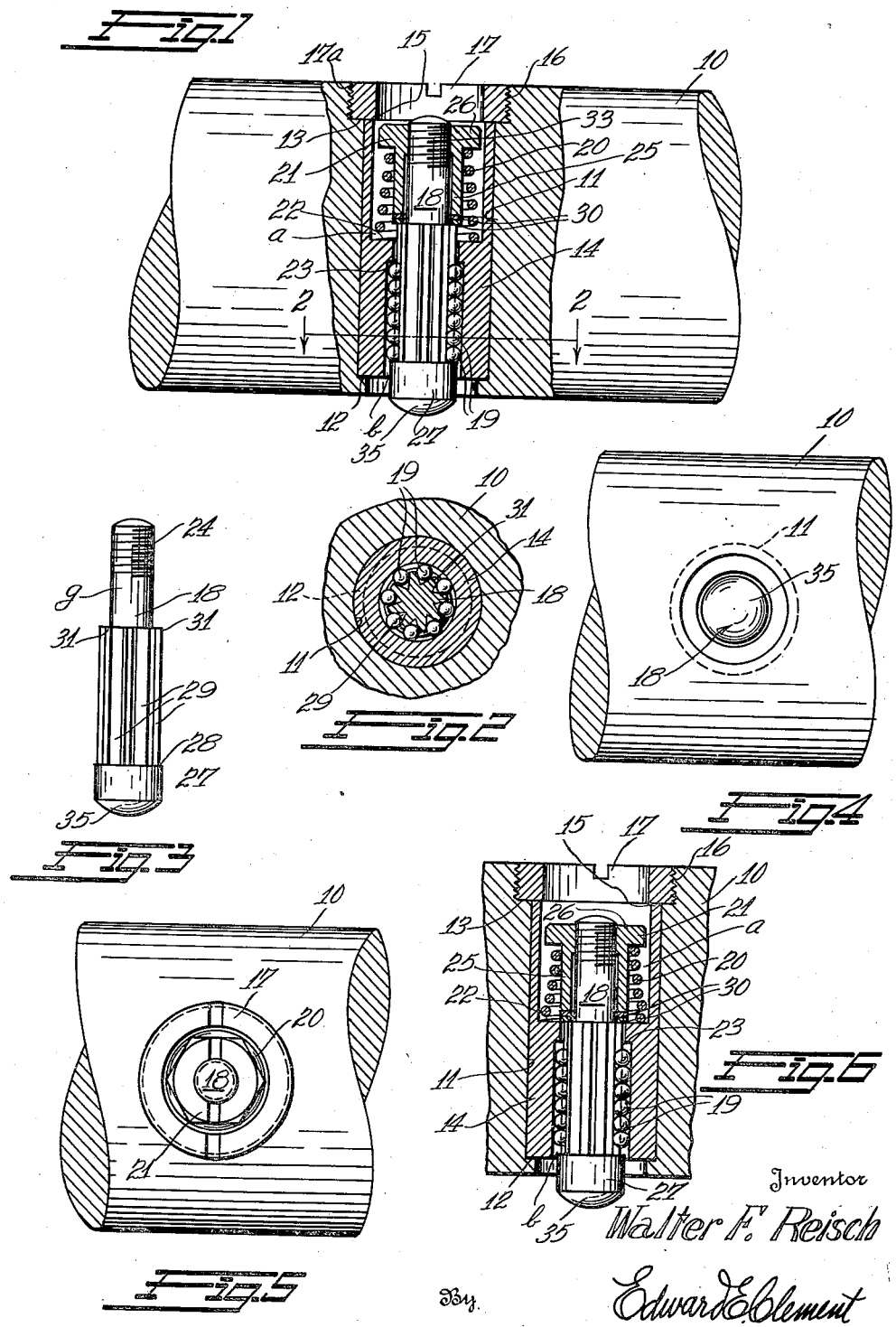
Inventor
Walter F. Reisch
By
Edward E. Clement
Attorney Patented May 13, 1941

2,242,194

UNITED STATES PATENT OFFICE 2,242,194

OVERSPEED EMERGENCY GOVERNOR

Walter F. Reisch, Charleston, W. Va.

Application June 12, 1939, Serial No. 278,749

3 Claims. (Cl. 264—17)

This invention relates to centrifugal governors and more particularly to improvements in plunger or bolt type governors such as are used for unlatching or tripping out automatic stop valves or switches on rotary machines, turbines, engines and electrical apparatus when the speed of the apparatus exceeds a predetermined limit.

An object of this invention is to substantially eliminate friction of bolt or plunger type emergency governors, now in general use.

Another object is to substantially eliminate all wear between the reciprocating plunger bolt and the driven shaft of a turbine or other apparatus in which said bolt is housed.

Yet another object of the invention is to provide means to adjust the plunger to operate at any desired speed of the turbine, shaft, or wheel, etc. the plunger is to govern.

In all prior bolt type emergency governors friction between the bolt and the bolt holding bore is one of the chief defects of operation. Lack of lubrication will cause the old type device to become extremely sluggish in operation so that it is impossible to set the bolt plunger for accurate operation at predetermined speeds. Also, I have had much trouble with the old type devices, which make no satisfactory provisions to guard against friction, as I have done, by collection of gummy oil deposits and grit, which not only render the device sluggish and inaccurate in operation, but will cause clogging and gradually become totally inoperative.

Further, in all bolt type emergency governors prior to my device mounted within a rotatable shaft or wheel, a hole is bored in the shaft and the plunger inserted directly therein. This is very objectionable as the walls of the hole in the shaft become worn due to vibration and the relatively softer material of the shaft with respect to that of the plunger bolt. This defect is eliminated by the provision of a sleeve assembly of tool steel hardened to prevent excessive wear adapted to be inserted in the shaft bore and receive the plunger bolt.

Other objects and advantages of my invention will be apparent from the following detailed description when considered with the accompanying drawing, in which:

Figure 1 is a cross-section view of my invention housed within a shaft ready for operation with the shaft at rest.

Figure 2 is a cross-section view showing the plunger bolt and housing sleeve taken on the line 2—2 of Figure 1.

Figure 3 is an elevational view of the plunger bolt per se.

Figure 4 is an elevational view of the plunger head and housing sleeve as it appears in normal position with the shaft at rest.

Figure 5 is a top elevational view of the housing sleeve locking ring nut and the plunger bolt spring adjusting nut.

Figure 6 is a cross-section view similar to Figure 1 showing the plunger extended against the tension of the regulating spring by centrifugal action.

Referring in detail to the drawing 10 represents a driven shaft of a turbine, engine, or electrical apparatus.

The shaft 10 is centrally bored through transversely then counterbored at 11 nearly through the shaft to form an annular shoulder 12 at one side of the shaft 10 and then again counterbored at 16 to form an annular shoulder 13.

Resting upon the shoulder 12 within the counterbore 11 is a sleeve 14 of hardened tool steel with its outer edge 15 substantially level with shoulder 13.

The counterbore 16 is internally threaded to receive a ring nut 17 adapted to abut against the edge 15 of sleeve 14 and lock or hold the same within the counterbore 11 of the shaft 10.

The sleeve 14 is specially bored to receive a plunger bolt 18, a plurality of ball bearings 19, a conical antifriction tension spring 20 and a spring tension regulating nut 21.

Intermediate the ends of the sleeve 14 and centrally disposed within the bore thereof are shoulders 22 and 23.

On the shoulder 22 rests a conical spring 20 through which extends the threaded end 24 of the bolt 18 and that portion thereof contiguous thereto.

Threaded on end 24 of bolt 18 is a nut 21 having a depending skirt 25 and a relatively large head 26.

The sleeve 14 is counterbored at each end to form the shoulders 22 and 23 and two chambers of varying sized bores are formed within the said sleeve.

The larger chamber is hereinafter called the spring chamber and the smaller chamber the bearing chamber or chambers a and b respectively.

The bolt 18 is specifically constructed and has a relatively large head 27 from which extends the shank of the bolt with the section nearest the head having elongated bearing grooves 29 extending longitudinally from a shoulder 28 formed by the head 27, said bearing grooves extending substantially two-thirds of the length of bolt 18.

Extending from the bearing grooves 29 is the remaining portion of the bolt shank having its end threaded at 24.

The governor unit to be inserted in the bore 11 of shaft 10 is generally assembled as follows:

Bolt 18 is partially inserted, threaded end 24 first, within the sleeve 14 and ball bearings 19 are inserted in the bearing grooves 29. The number of ball bearings used is optional and depends to some extent on the judgment and experience of the machinist.

After insertion of bearings 19 in the bearing grooves 29, the bolt is shoved forward inwardly, until the said stacked ball bearings 19 are pushed against shoulder 23 by the shoulder 28 of bolt head 27, as shown in Figure 1.

The threads 24 are then at the extreme end of the spring chamber $a$ and a conical spring 20 is dropped down over the bolt 18 with the larger end thereof resting upon shoulder 22. The tapered helical spring 20 when compressed by the nut 21 due to its tapering shape will not bulge at any portion of its length and contact the walls of the spring chamber $a$. This will obviously eliminate any binding of the spring between the said chamber walls and the reciprocating bolt 18, thereby eliminating any friction between the said parts.

Next two or more spacing washers or shims 30, slightly larger than the threaded end of bolt 18 are dropped down over the bolt 18 at this end and rest upon a plurality of longitudinal rib ends 31 formed by the said bearing grooves 29.

A spring tension regulating nut 21 having an enlarged hexagonal slotted head 26 with internal screw threads 33, complementary to screw threads 24 and having a depending skirt 25 with a smooth inner bore, is now threaded onto the bolt 18 at 24, until the end of the skirt portion 25 rests on the washers 30, the under side of the enlarged head 26 compressing the conical spring 20 against the shoulder 22.

Tension of the spring 20 is varied by the cooperation of one or more shims 30 and enlarged head 26 of regulating nut 21. The nut 21 is to be threaded on plunger 18, until the skirt 25 binds against one of the shims 30 for proper adjustment of the spring 20 for efficient operation of the plunger bolt in response to centrifugal action of the shaft 10. The greater the number of shims used the less the tension of spring 20.

The sleeve 14 with all the above assembled parts is now inserted and finally secured in the shaft bore 11 by relatively large ring nut 17. The ring nut 17 having external threads 17a complementary with the internal threads of counterbore 16.

The pre-assembled unit is now in the turbine shaft 10 and ready for operation.

The operation of my emergency overspeed governor functions when the rotating speed of the machine exceeds the speed for which the governor is adjusted, as hereinbefore described, so that the plunger 18 unbalanced slightly by centrifugal force will slide outward, rolling free on ball bearings 19 and overcoming the tension or compression of the tapering helical spring 20.

Rounded nose 35 of plunger head 27 strikes a tripping finger, not shown, which unlatches mechanism to stop the machine.

If friction of ball bearings 19 against each other when rolling is noticeable they may be spaced apart by a cage, not shown, if desired.

Although the features of this invention have been described specifically and in detail, it is to be understood that various changes in construction may be resorted to within the scope of the appended claims.

What is claimed and desired to be secured by United States Letters Patent is:

1. A centrifugal bolt type governor for controlling the speed of rotation of an element comprising means, including a plunger bolt having a relatively large head, a shank including ribs extending throughout a portion of its length and a relatively smaller portion with a threaded end, a sleeve surrounding the said shank portion of the bolt with one large chamber and one small chamber therein each having peripheral walls and a shoulder in each of said chambers, said smaller chamber in the sleeve housing a portion of the rib portion of the bolt shank and the large chamber of the sleeve housing the smaller threaded portion of the bolt shank, a plurality of ball bearings between the said ribs in said bolt shank the end balls of said ball bearings resting against the shoulder in said small chamber, a nut having a head and a relatively circumferentially smaller depending skirt portion adapted to thread upon smaller portion of the bolt shank and abut against the end parts of the ribs on the bolt shank; and a tapered coil spring around said skirt portion of said nut spaced from the peripheral wall of said large chamber adapted to be compressed between the inner end wall of said large chamber and the underside of said nut head to adjust the resistance of said plunger bolt to reciprocating movement responsive to centrifugal force when mounted in a rotary element.

2. In subcombination a sleeve for housing a centrifugal plunger type, spring controlled, ball bearing governor comprising a cylindrical sleeve having a relatively large chamber at one end for receiving the governor spring, a smaller chamber at its other end for housing said ball bearings, and an interconnecting bore concentric to said chambers, said bore and said relatively large chamber forming an annular shoulder of substantial width against which one end of the governor spring is designed to abut and said bore and said smaller chamber forming an annular shoulder of a lesser width against which the end balls of said ball bearings abut when said plunger is retracted.

3. A centrifugal governor for use in governing the speed of a rotating apparatus comprising a rotating shaft having a transverse opening, one end of which has a shoulder and the other end of which is internally threaded; a hardened steel sleeve disposed in said opening with one end abutting said shoulder and having a relatively large chamber at one end for receiving a governing spring, a plurality of shims and an adjusting nut, a smaller chamber in the shoulder abutting end of said sleeve for receiving the head of a centrifugal responsive plunger and a multiplicity of ball bearings and a reduced bore interconnecting said chambers; a governing plunger responsive to centrifugal force extending through said smaller chamber and said bore and into said relatively large chamber and having a relatively large head, a shank including longitudinal ribs extending throughout a portion of its length and forming grooves for retaining said multiplicity of ball bearings in a series of spaced rows, and a threaded extremity of reduced size, the ribs of the grooved portion forming abutments against which the said shims are seated; a multiplicity of ball bearings disposed in said grooves and engaging the walls of said smaller chamber and the end balls of said ball bearings in each row adjacent the end wall of said smaller chamber adapted to engage and disengage said end wall adjacent said reduced bore, said ball bearings forming the sole means for guiding said plunger in its governing movement; a plurality of spacing shims stacked around a portion of said plunger in said relatively large chamber; a tapered coil spring for controlling the action of said plunger disposed in said relatively large chamber in encircling relation to the portion of said plunger which extends into said chamber and having its larger end abutting the end wall of said chamber; a nut threadedly engaging the threaded end of said plunger and having a skirt extending within the smaller end of said coil spring the peripheral edge thereof adapted to bind against the top spacing shim and an enlarged head abutting the smaller end of said coil spring, whereby tightening of said nut against the top spacing shim regulates the tension of said coil spring and draws said plunger into normal non-governing position; and an externally threaded nut threadedly engaging the threads of said opening and abutting the relatively large chamber end of said sleeve for retaining said sleeve and the governor parts mounted therein in operative relation in said transverse opening.

WALTER F. REISCH.